United States Patent [19]

Alvares et al.

[11] 4,172,928
[45] Oct. 30, 1979

[54] EXPANDIBLE PARTICLES OF STYRENE POLYMERS AND PROCESS FOR PREPARING SAME

[75] Inventors: Antonio Alvares, Mantova; Guido Bertazzoni, Campitello di Marcaria, Italy

[73] Assignee: Montedison S.p.A., Milan, Italy

[21] Appl. No.: 920,071

[22] Filed: Jun. 28, 1978

[30] Foreign Application Priority Data

Jun. 30, 1977 [IT] Italy ............................. 25227 A/77

[51] Int. Cl.² .............................................. C08J 9/14
[52] U.S. Cl. .................................. 521/97; 521/58; 521/907
[58] Field of Search ................................ 521/97, 907

[56] References Cited

U.S. PATENT DOCUMENTS

| | | | |
|---|---|---|---|
| 3,162,613 | 12/1964 | Tousignant | 521/97 |
| 3,207,731 | 9/1965 | Tousignant | 521/97 |
| 3,210,326 | 10/1965 | Tousignant et al. | 521/97 |
| 3,271,333 | 9/1966 | Eichhorn | 526/1 |

*Primary Examiner*—Morton Foelak

[57] ABSTRACT

Expandible particles of styrene particles for producing molded bodies, particularly large blocks having a homogeneous fine-cell structure, and having improved characteristics, are obtained by polymerizing styrene or a mixture of styrene and one or more different monomers copolymerizable with styrene, in the presence of at least one compound of the following general formulae (I) or (II)

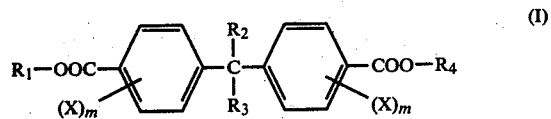

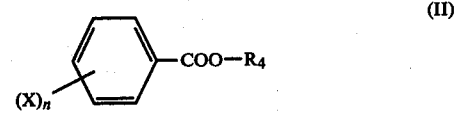

wherein
$R_1$ and $R_4$, either like or unlike each other, are an optionally halogen-substituted alkyl radical containing 1 to 30 carbon atoms;
$R_2$ and $R_3$, like or unlike each other, are an alkyl, cycloalkyl or phenyl radical, optionally halogen-substituted;
X is a halogen or an alkyl radical having 1 to 8 carbon atoms;
m is an integer from 0 to 4; and
n is an integer from 0 to 5.

8 Claims, No Drawings

EXPANDIBLE PARTICLES OF STYRENE POLYMERS AND PROCESS FOR PREPARING SAME

THE PRIOR ART

It is known that shaped bodies made of expanded styrene polymers can be produced by molding, in a closed but not gas-tight mold, styrene polymer particles containing gaseous or liquid expanding agents, at a temperature exceeding both the boiling point of the expanding agent and the softening point of the polymer.

According to a conventional method, the styrene polymer particles containing the expanding agent are first heated (pre-expansion) in an open or closed vessel until a pre-established apparent density is reached and then, after a suitable ageing period, further expanding the aged particles by heating (molding) the same in a pressure-resistant but not gas-tight mold, which heating causes the polymer particles to sinter to a body having the shape of the mold. After molding, the shaped body is allowed to cool in the mold for a period of time sufficient to avoid deformation of the shaped body on removal thereof from the mold.

It has been suggested to reduce the residence time in the mold by incorporating small amounts of halogenated organic compounds in the styrene polymer. However, the known compounds which have been suggested for that purpose have several drawbacks, in practice. Thus, they develop bad odors during the pre-expansion step, or do not permit simultaneous realization of other commercially desirable results, such as
low shrinkage of the block thickness, i.e., a shrinkage not exceeding 1%;
a moisture content of the expandible particles not exceeding 0.3%; and
a fine-cell, homogeneous structure of the expanded block.

THE PRESENT INVENTION

An object of this invention is to provide improved expandible particles of styrene polymers which have a low moisture content, not higher than 0.3% and which, after a relatively short residence time in the mold, result in expanded shaped objects, especially large blocks, characterized by a fine-cell, homogeneous structure and low shrinkage of the body (or block) thickness, not greater than 1%.

That object is achieved by this invention, in accordance with which there is incorporated in the styrene polymer, in an amount not exceeding 1% by weight, at least a compound of general formula (I) or (II) as follows:

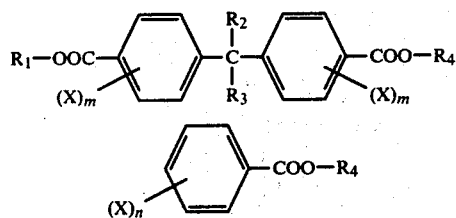

as defined in the Abstract.

The expandible styrene polymer particles can be obtained by polymerizing styrene, or a mixture of styrene with monomers copolymerizable with it, in the presence of at least a compound of formula (I) or (II) and of a conventional expanding agent.

To obtain the desirable expanded molded bodies, the expandible particles of the invention are first pre-expanded, then aged, and finally molded in a pressure-resistant but not gas-tight mold.

The expandible particles of the invention, and the expanded shaped bodies molded from them, in particular the blocks, have the following compendium of commercially important characteristics:

(a) short residence time in the mold, generally less than 50% of the time required to cool the blocks prepared from pre-expanded particles not containing the above-cited compounds of general formula (I) or (II);

(b) shrinkage of the block thickness less than 1%;

(c) (total) moisture of the expandible particles lower than 0.3% and practically identical with that of the particles prepared in the absence of the organic compounds having general formula (I) or (II);

(d) fine-cell homogeneous structure of the expanded block;

(e) full absence of acrid odors during the pre-expansion step.

The compounds of formula (I) or (II) incorporated in the expandible styrene polymer particles of this invention may be selected from a wide class of products having said formula (I) or (II).

Among such compounds, those free of halogen and in which $R_1$ and $R_4$ contain more than 8 carbon atoms are of particular industrial interest.

The compound or compounds of general formula (I) and/or (II) are usually added to styrene or to the monomeric mixture before or during polymerization, optionally in a mixture with the expanding agents.

Even small amounts of the compounds (I) and/or (II), such as 0.005% by weight on the monomer, or monomers weight, can influence the polymer properties. In practice, however, the best results are obtained using amounts of said compounds ranging from 0.05% to 0.2% by weight.

The term "styrene polymers" as used herein includes styrene homopolymers, as well as copolymers of styrene with other vinyl and/or vinylidene monomers, the copolymers containing at least 50% by weight of chemically combined styrene.

Examples of the useful co-monomers are alpha-methylstyrene, styrenes halogenated in the nucleus, acrylonitrile, methacrylonitrile, esters of acrylic and/or methacrylic acids with alcohols containing 1 to 8 carbon atoms, N-vinyl compounds such as vinylcarbazole, etc. The term "styrene polymers" includes, also, copolymers containing, besides styrene and, optionally, the aforesaid vinyl and/or vinylidene monomers, small amounts of monomers containing two double bonds, such as divinyl benzene.

As already indicated, besides the compounds having the general formula (I) and (II), known expanding agents are generally added and present during the polymerization step.

Particularly useful expanding agents are aliphatic hydrocarbons containing from 2 to 6 carbon atoms, either individually or in suitable mixtures, such as propane, butane, n-pentane, iso-pentane, hexane, cyclohexane and the like, and halogenated derivatives of aliphatic hydrocarbons containing from 1 to 3 carbon atoms, such as chlorofluoro-derivatives of methane, of ethane and of ethylene.

The styrene polymers according to this invention may contain other additives, such as flame-extinguishing agents, organic and inorganic fillers, dyes, antistatic agents, non-agglomerating agents for preventing the formation of crumbs during the pre-expansion, plasticizers and other adjuvants.

Polymerization of styrene, preferably in an aqueous suspension, admixture of the expanding agent, pre-expansion of the expandible particles thus obtained, ageing and transformation of the pre-expanded and aged particles into shaped bodies, by molding in closed molds, are carried out according to known and described techniques, for example, in "Rigid Plastic Foams" by T. N. Ferrigno, Reinhold Publishing Corp., New York, (1963).

The following Examples are given to illustrate the invention in more detail and are not intended to be limiting.

EXAMPLES 1 TO 7

Polymerization tests were carried out in aqueous suspensions of mixtures made up of:

|  | Parts by Weight |
|---|---|
| styrene monomer | 100. |
| deionized water | 100. |
| polymerization initiator (mixture of tert.-butylperoxide and tert.-butylperbenzoate) | 0.2 |
| acrylic acid/2-ethyl-hexyl-acrylate copolymer (ratio by weight = 89/11) as suspending agent | 0.05 |
| NaCl | 0.10 |
| compound having general formula (I) or (II) of the type and in the amount indicated in the Table. |  |

Polymerization was carried out at temperatures ranging from 100° C. to 140° C. for a total period of 20 hours.

During the polymerization, 8 parts by weight of an expanding agent consisting of a mixture of n-pentane and isopentane were mixed with the aforesaid suspension. After cooling to room temperature, filtering, washing with water and drying at 35°-40° C . for 7 hours, the polymer was subjected to screening in order to obtain expandible polystyrene particles having diameters between 0.9 and 1.6 mm. Said particles contained about 6% by weight of expanding agent.

The expandible particles were mixed with a conventional non-agglomerating agent in an amount equal to 0.15% by weight. The mixing was carried out in a SAGA screw-mixer, at room temperature, for about 10 minutes.

The expandible particles so treated were fed to a pre-expander (Erlenbach Mod. K2), with a screw-inlet on the bottom and an outlet for the pre-expanded material from the top, in which they were pre-expanded by means of steam at 95°-100° C. for about 5 minutes.

The pre-expanded particles were aged in air, at room temperature, for approximately 24 hours, and then introduced into a Rauscher block-making press until filling of a mold having the following dimensions: 100×100×50 cm. Molding was effected by means of steam at 1 kg/cm² gauge. Density, cooling time, thickness shrinkage, and sintering degree were determined on the molding block, the values of such characteristics being given in the Table.

"Cooling time" of the blocks means the time required to cause the pressure inside the block to fall to zero, at the conclusion of the treatment with steam. Both shrinkage and sintering degree of the blocks were determined 48 hours after molding. The sintering degree was evaluated on a thin plate, obtained from the central part of the block by hot-slinging, and determined as the percentage of expanded particles which broke when the plate was broken. The cellular structure of all of the expanded beads, in all runs, was homogeneous and fine-cell.

TABLE

|  | Example No. | | | | | | |
|---|---|---|---|---|---|---|---|
|  | 1 | 2 | 3 | 4 | 5 | 6 | 7 |
| Type of compound having general formula (I) or (II) | — | a | b | c | d | e | f |
| Amount of compound of general formula (I) or (II) in percent | — | 0.1 | 0.1 | 0.1 | 0.05 | 0.05 | 0.1 |
| Total moisture content of the expandible particles, in percent | 0.20 | 0.28 | 0.28 | 0.26 | 0.26 | 0.28 | 0.26 |
| Odors during pre-expansion | none | none | none | none | none | none | none |
| Characteristics of the molded block |  |  |  |  |  |  |  |
| Density, in kg/cm³ | 20 | 20 | 20 | 20 | 20 | 20 | 20 |
| Cooling time, in minutes | 62 | 28 | 29 | 20 | 24 | 22 | 24 |
| Sintering degree, in percent | 70 | 70 | 70 | 70 | 70 | 70 | 70 |
| Shrinkage of the block thickness, in percent | <1 | <1 | <1 | <1 | <1 | <1 | <1 |

The compounds identified as (a) to (f) in the Table are as follows:

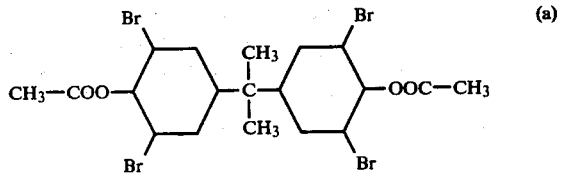

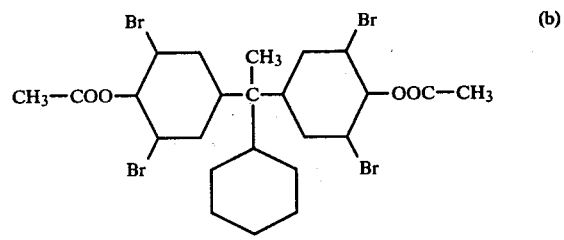

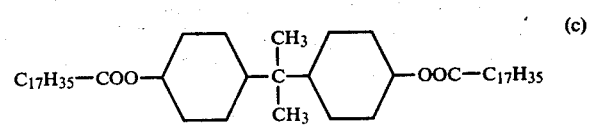

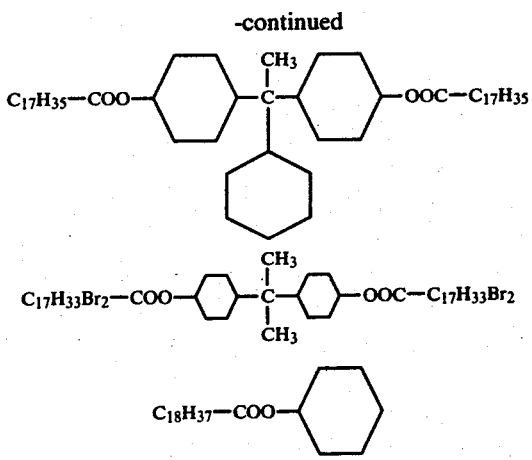

From the values recorded in the Table, it is apparent that by incorporating the organic compounds having general formula (I) or (II) in the expandible styrene polymers, it is possible to obtain a compendium of commercially desirable and important results, including:

low moisture content of the expandible particles, in any case of the same value as that of particles not containing the formula I and/or II compounds;
total absence of odors during pre-expansion;
short cooling time of the blocks;
shrinkage of the block thickness lower than 1%;
high sintering degree; and
fine-cell homogeneous structure.

What we claim is:

1. Expandible particles of styrene homopolymers or of copolymers of styrene and a monomer copolymerizable therewith characterized in having a total moisture content of less than 0.3% by weight and in that, when used in the production of expanded molded bodies, result in
   (1) short residence time in the mold;
   (2) less than 1% shrinkage of the thickness of the molded body;
   (3) a high degree of sintering;
   (4) fine-cell, homogeneous structure of the expanded molded body; and
   (5) complete absence of acrid odors during pre-expansion thereof;
   said particles being further characterized in containing an effective amount, but not more than 1% by weight on the weight of the styrene or mixture of styrene with a monomer copolymerizable therewith, of at least one compound having one of the following formulae:

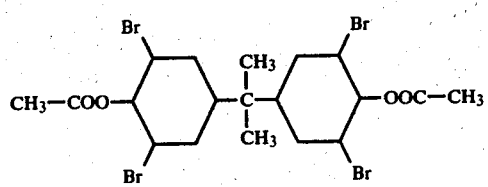

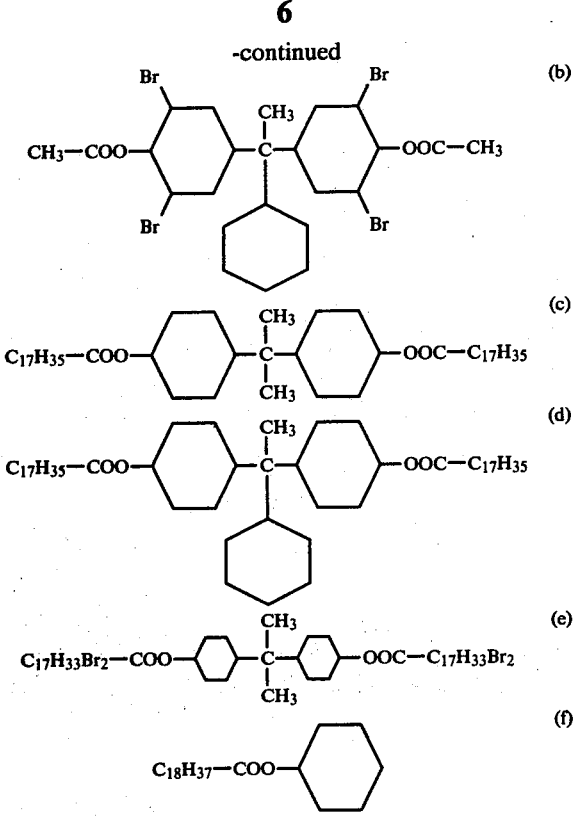

2. Expandible polystyrene particles according to claim 1, in which the amount of compound having formulae (a) to (f) is from 0.05 to 0.2% by weight.

3. Shaped bodies of expanded styrene polymers obtained by molding, in a pressure-resistant but not gas-tight mold, pre-expanded expandible particles according to claim 1.

4. Process for preparing expandible styrene homopolymers or copolymers of styrene with a monomer copolymerizable therewith which homopolymers and copolymers have the characteristics defined in claim 1, said process comprising polymerizing styrene or mixture of styrene and monomer copolymerizable therewith in the presence of an expanding agent and of an effective amount, but not exceeding 1% by weight on the weight of the styrene or mixture of styrene with a monomer copolymerizable therewith, of at least one compound having one of the formulae (a) to (f) of claim 1.

5. The process of claim 4, in which styrene is polymerized to a homopolymer.

6. The process of claim 4, in which a mixture of styrene and at least one other vinyl and/or vinylidene monomer copolymerizable with styrene is copolymerized to a copolymer containing at least 50% by weight of copolymerized styrene.

7. The process of claim 4, in which the amount of the compound having formulae (a) to (f) is comprised between 0.05 and 0.2% by weight on the weight of the styrene or mixture of styrene and monomer copolymerizable therewith.

8. The process of claim 4, in which the compound of formulae (a) to (f) is halogen-free.